United States Patent
McCloskey et al.

(10) Patent No.: US 6,300,460 B1
(45) Date of Patent: Oct. 9, 2001

(54) MIXED DIALKALI METAL SALTS OF SULFURIC ACID CONTAINING AT LEAST ONE CESIUM EQUIVALENT AS POLYMERIZATION CATALYSTS

(75) Inventors: Patrick Joseph McCloskey, Watervliet; Timothy Brydon Burnell, Niskayuna; Paul Michael Smigelski, Jr., Schenectady; Alberto Nisoli, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/612,652

(22) Filed: Jul. 6, 2000

(51) Int. Cl.⁷ .................................................... C08G 64/00
(52) U.S. Cl. ............................................ 528/196; 528/198
(58) Field of Search ...................................... 528/196, 198

(56) References Cited

U.S. PATENT DOCUMENTS 6,177,537 * 1/2001 Caruso et al. ...................... 528/196

* cited by examiner

*Primary Examiner*—Terressa M. Boykin
(74) *Attorney, Agent, or Firm*—Noreen C. Johnson; Douglas E. Stoner

(57) ABSTRACT

This invention relates to mixed dialkali metal salts of sulfuric acid containing at least one cesium equivalent useful in catalyst systems in melt polymerizations. The catalysts provide product with low branching side reaction products and good properties.

13 Claims, No Drawings

MIXED DIALKALI METAL SALTS OF SULFURIC ACID CONTAINING AT LEAST ONE CESIUM EQUIVALENT AS POLYMERIZATION CATALYSTS

FIELD OF THE INVENTION

This invention relates to mixed dialkali metal salts of sulfuric acid containing at least one cesium equivalent useful in catalyst systems in melt polymerizations. The invention further relates to polycarbonates prepared using the catalyst systems of the present invention, and articles made from these polycarbonates.

BACKGROUND OF THE INVENTION

Conventional industrial plants synthesize polycarbonate by mixing together an aqueous solution of dihydric compound (e.g., bisphenol-A) with an organic solvent (e.g., dichloromethane) containing a carbonyl halide (e.g., phosgene) Upon mixing the immiscible organic and aqueous phases, the dihydric compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

The interfacial method for making polycarbonate has several inherent disadvantages. First it is a disadvantage to operate a process that requires phosgene as a reactant due to obvious safety concerns. Second it is a disadvantage to operate a process that requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chlorine content, which can cause corrosion.

Some new commercial polycarbonate plants synthesize polycarbonate by a transesterification reaction whereby a diester of carbonic acid (e.g., diphenylcarbonate) is condensed with a dihydric compound (e.g., bisphenol-A). This reaction is performed without a solvent, and is driven to completion by mixing the reactants under reduced pressure and high temperature with simultaneous distillation of the phenol produced by the reaction. This synthesis technique is commonly referred to as the "melt" technique. The melt technique is superior over the interfacial technique because it does not employ phosgene, it does not require a solvent, and it uses less equipment. Moreover, the polycarbonate produced by the melt process does not contain chlorine contamination from the reactants, has lower particulate levels, and has a more consistent color. Therefore it is highly desirable to use the melt technique in a commercial manufacturing process.

In the production of polycarbonates by the melt polymerization process, alkali metal hydroxides, in particular sodium hydroxide, are used as polymerization catalysts. While alkali metal hydroxides are useful polymerization catalysts, they also effect side reactions which results in branched side reaction products. This causes changes in the melt behavior of the polycarbonate, which can lead to difficulties in processing.

It would be desirable, therefore, to develop a catalysts system which effects melt polymerization while minimizing undesirable reaction products, such as branched side reaction products.

BRIEF SUMMARY OF THE INVENTION

This invention relates to a method for the preparation of polycarbonate by the melt process comprising reacting a diphenol and a diarylcarbonate in the presence of a catalyst system comprising a catalytically effective amount of a mixed dialkali metal salt of sulfuric acid containing at least one cesium equivalent.

DETAILED DESCRIPTION OF THE INVENTION

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the following specification, reference will be made to a number of terms that shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "melt polycarbonate" refers to a polycarbonate made by the transesterification of a carbonate diester with a dihydroxy compound.

"BPA" is herein defined as bisphenol A or 2,2-bis(4-hydroxyphenyl)propane.

"Catalyst system" as used herein refers to the catalyst or catalysts that catalyze the transesterification of the dihydric phenol and the carbonic acid diester in the melt process.

The terms "diphenol" and "dihydric phenol" as used herein are synonymous.

The term "mixed dialkali metal salts" is herein defined as a salt containing two different alkali metal equivalents.

"Catalytically effective amount" refers to the amount of the catalyst at which catalytic performance is exhibited.

"Cesium salt" as used herein refers to a dialkali metal salt of sulfuric acid containing at least one cesium equivalent.

In the present invention, it was unexpectedly found that a catalyst system comprising a mixed dialkali metal salt of sulfuric acid containing at least one cesium equivalent reduces side reaction products, including "Fries" product and other branched side reaction products. The reduction of these products provides the advantage of increased ductility, and prevents the reduction of rheological properties which results when undesirable side reaction products, such as Fries product, are present. It was further unexpectedly found that for a given set of conditions the catalyst systems as described in the present invention product less Fries than alkali metal hydroxides, such as sodium hydroxide.

Specifically, the present invention provides a catalyst system for the production of polycarbonate by the melt process, wherein the polycarbonate has a reduced content of undesirable branched side reaction product, in particular Fries products. It is desirable to have Fries product of less than 1000 ppm, preferably less than 900 ppm, more preferably less than 500 ppm, even more preferably less than 200 ppm.

Polycarbonate produced by the melt process typically has higher Fries content than polycarbonates produced by the interfacial method. As used herein the term "Fries" or "fries" refers to a repeating unit in polycarbonate having the following formula (I):

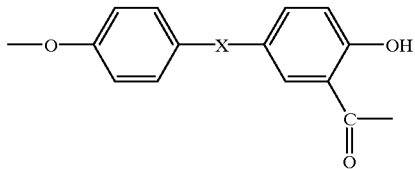

where the X variable represents

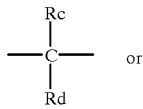

Variable $R_c$ and $R_d$ each independently represent a hydrogen atom or a monovalent hydrocarbon group and may form a ring structure. Variable $R_e$ is a divalent hydrocarbon group.

It is very desirable to have a low Fries content in the polycarbonate product, as Fries products reduce the performance characteristics of the polycarbonate, such as the ductility. Higher Fries contents results in lower ductility. Preparing polycarbonate by the melt process results in the formation of Fries products.

The present invention relates to melt polymerization catalysts in a melt polymerization system in which a dihydric phenol and a diester of carbonic acid are reacted. Dihydric phenols which are useful in preparing the polycarbonate of the invention may be represented by the general formula

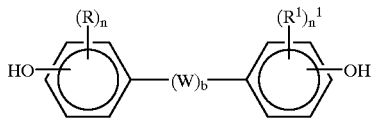

wherein:
  R is independently selected from halogen, monovalent hydrocarbon, and monovalent hydrocarbonoxy radicals;
  $R^1$ is independently selected from halogen, monovalent hydrocarbon, and monovalent hydrocarbonoxy radicals:
  W is selected from divalent hydrocarbon radicals,

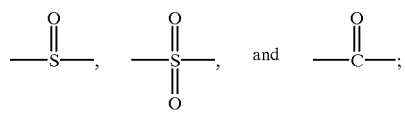

n and $n^1$ are independently selected from integers having a value of from 0 to 4 inclusive; and
  b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula—$OR^2$ wherein $R^2$ is a monovalent hydrocarbon radical of the type described hereinafore. Preferred monovalent hydrocarbonoxy radicals are the alkoxy and aryloxy radicals.

Suitable dihydric phenols include, but are not limited to, BPA; 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl)decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4-dihydroxyphenyl ether; 4,4-thiodiphenol; 4-4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis(3-methyl-4-hydroxyphenyl)-1-phenylethane, and mixtures thereof. In one embodiment, the residues of dihydric phenol in the polycarbonate comprise 100 mol% of residues derived from BPA.

Optionally, polyfunctional compounds may be utilized. Suitable polyfunctional compounds used in the polymerization of branched polycarbonate include, but are not limited to,
  1,1,1-tris(4-hydroxyphenyl)ethane,
  trimellitic anhydride,
  trimellitic acid, or their acid chloride derivatives.

As the diester of carbonic acid, various compounds may be used, including, but not limited to diaryl carbonate compounds, dialkyl carbonate compounds and alkylaryl carbonate compounds. Suitable diesters of carbonic acid include, but are not limited to, diphenyl carbonate; bis(4-t-butylphenyl)carbonate; bis(2,4-dichlorophenyl)carbonate; bis(2,4,6-trichlorphenyl)carbonate; bis(2-cyanophenyl)carbonate; bis(o-nitrophenyl)carbonate; ditolyl carbonate; m-cresol carbonate; dinaphthyl carbonate; bis(diphenyl) carbonate; diethylcarbonate; dimethyl carbonate; dibutyl carbonate; dicyclohexyl carbonate; and mixtures thereof. Of these, diphenyl carbonate is preferred. If two or more of these compound are utilized, it is preferable that one is diphenyl carbonate.

In the process of the present invention, an endcapping agent may optionally be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable endcapping agents include, but are not limited to phenol, p-tert-butylphenol; p-cumylphenol; p-cumylphenolcarbonate; undecanoic acid, lauric acid, stearic acid; phenyl chloroformate, t-butyl phenyl chloroformate, p-cumyl chloroformate, chroman chloroformate, octyl phenyl; nonyl phenyl chloroformate or a mixture thereof.

If present, the endcapping agent is preferably present in amounts of about 0.01 to about 0.20 moles, preferably about 0.02 to about 0.15 moles, even more preferably about 0.02 to about 0.10 moles per 1 mole of the dihydric phenol.

It was unexpectedly found that catalyst systems comprising a mixed dialkali metal salt of sulfuric acid containing at least one cesium equivalent provides polymerization rates comparable to alkali metal hydroxides, such as sodium hydroxide, while providing less undesirable branching side products. The branching side products include, but are not limited to Fries products.

Commonly assigned copending application Ser. No. 09/215,482 "Method for the Preparation of Bisphenol-A Polycarbonate with Reduced Levels of Fries" discloses the use of cesium salts as catalysts that are effective in producing low Fries. There is no disclosure in the aforementioned application, however, that mixed alkali metal sulfate salts containing at least one cesium equivalent produce even more desirable Fries levels.

Suitable mixed dialkali metal sulfate salts containing at least one equivalent of cesium include but are not limited to lithium cesium sulfate; potassium cesium sulfate; sodium cesium sulfate and a mixture thereof. Mixed dialkali metal sulfate salts containing at least one equivalent of cesium are also referred to herein as "mixed cesium sulfate salts".

In one embodiment of the present invention, the catalyst system comprises a base cocatalyst in addition to the mixed dialkali metal sulfate salt containing at least one equivalent of cesium. Suitable base cocatalysts include, but are not limited to, ammonium compounds, phosphonium compounds, and mixtures thereof. Preferred compounds include quaternary ammonium compounds, quaternary phosphonium compounds, and mixtures thereof. Examples of quaternary ammonium compounds include, but are not limited to, tetramethylammonium hydroxide (TMAH); tetraethylammonium hydroxide; tetrabutylammonium hydroxide; trimethylbenzylammonium hydroxide and mixtures thereof. Examples of suitable quaternary phosphonium compounds include, but are not limited to, tetramethylphosphonium hydroxide; tetraethylphosphonium hydroxide; tetrabutylphosphonium hydroxide and mixtures thereof.

Cesium salts were found to have varying levels of activity. For example, cesium sulfate provided the best rate of polymerization for the class of cesium salts. Compared to sodium hydroxide, cesium sulfate provided a comparable polymerization rate with less of the side branching product formation, including Fries product. Sodium sulfate was found to be essentially inactive. The performance of mixed dialkali metal sulfate salts containing at least one equivalent of cesium according to the present invention, however, such as sodium cesium or potassium cesium sulfate, provided excellent polymerization rate while generating very low side reaction product, such as Fries product. These catalysts provided the surprising effect of the increased polymerization activity of cesium with the low propensity to catalyze the side branching reaction that is demonstrated by the sodium and potassium sulfates.

The catalyst of the present invention may be introduced into the reaction system in a variety of forms. The catalyst may be added as a solid, for example a powder, or it may be dissolved in a solvent, for example water or alcohol. In one embodiment, the catalyst is introduced into the reaction system in the form of an aqueous solution. The salts may be prepared prior to introduction into the reaction system, or they may be formed in solution by the reaction of the appropriate acid and base.

The basicity of the cesium salts is important in determining the activity and selectivity of the cesium salts in the presence of an effective amount of base cocatalyst as defined in the present invention. It is desirable to maintain the pH, with respect to the stoichiometry of the solution, as low as possible, while maintaining the desired activity. Preferred pHs are in the range of about 3.2 to about 7.0. If the pH is less than about 3.0, the rate of polymerization is reduced, and a high molecular weight product is not obtained. If the pH is higher than about 7.0, side reactions are more likely to occur.

The desired molecular weight of the product depends on the intended use. For example, for optical materials, the number average molecular weight of the product is preferably in the range of about 7,500 to about 9,000; while for sheet materials the number average molecular weight is preferably in the range of about 25,000 to about 30,000. Therefore, it may be desirable to approach more acidic pHs in the synthesis of polycarbonate materials relatively low molecular weights, for example, optical materials. Typically, as the aqueous solution becomes more acidic, the catalyst becomes more selective, however the molecular weight of the resultant product decreases The mixed cesium sulfate salt is preferably used in an amount of from $10^{-8}$ to $10^{-3}$ moles of catalyst per 1 mole of dihydric phenol compound, more preferably $10^{-7}$ to $10^{-5}$ moles of catalyst per 1 mole of dihydric phenol compounds. When the amount is less than $10^{-8}$ mole, there is a possibility that catalyst activity is not exhibited. When the amount is greater than $10^{-3}$ moles per 1 mole of dihydric phenol, the properties of the final polycarbonate product may be adversely affected. The base, such as the quaternary ammonium salt/ and or phosphonium catalyst are preferably present in amounts of from $10^{-2}$ to about $10^{-6}$, preferably $10^{-3}$ to about $10^{-5}$ moles per 1 mole of dihydric phenol compounds, in addition to the cesium salt. The ratio of the base cocatalyst to the alkali metal by moles is preferably in the range of from about 1.0 to about 10,000, more preferably from about 10 to about 1000, even more preferably from about 25 to about 500

The reaction conditions of the melt polymerization are not particularly limited and may be conducted in a wide range of operating conditions. The reaction temperature is typically in the range of about 100 to about 350° C., more preferably about 180 to about 310° C. The pressure may be at atmospheric, or at an added pressure of from atmospheric to about 15 torr in the initial stages of the reaction, and at a reduced pressure at later stages, for example in the range of about 0.2 to about 15 torr. The reaction time is generally about 0.1 hours to about 10 hours.

The melt polymerization may be accomplished in one or more stages, as is known in the art. The salts of the nonvolatile acids and the base may be added in the same stage or different stages, if the melt polymerization is conducted in more than one stage.

In one embodiment, the process is conducted as a two stage process. In the two stage process, the first stage is an oligomerization stage, and the second stage is a polymerization stage. In the first stage of this embodiment, the base, for example the quaternary ammonium or phosphonium compound, is introduced into the reaction system comprising the dihydroxy compound and the carbonic acid diester. The first stage is conducted at a temperature of 290 ° C. or lower, preferably 150 to 290° C., more preferably 200 to 280° C. The duration of the first stage is preferably 0 to 5 hours, even more preferably 0 to 3 hours at a pressure from atmospheric pressure to 100 torr, with a nitrogen atmosphere preferred. Alternatively, the quaternary ammonium or phosphonium salt may be introduced prior to the first stage, in a monomer mix tank, for instance. The contents from the monomer mix tank are fed to the first stage., or anywhere in between. The molecular weight of the oligomer is less than 8,000 Mn The mixed cesium salt may also be introduced prior to the first stage. Alternatively, the mixed cesium salt may be added in its entire amount prior to the first stage, or it may be added in batches in the first, second or any subsequent stages so that the total amount is within the aforementioned ranges.

It is preferable in the second and subsequent stages of the polycondensation step for the reaction temperature to be raised while the reaction system is reduced in pressure compared to the first stage so as to remove the phenol by-product. The polymerization temperature can be in the range of 280 to 320 C. with pressures from 100 to 0.1 torr or less. The final molecular weight is typically greater than 8,000 Mn Additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The reaction can be conducted as a batch or a continuous process. Any desired apparatus can be used for the reaction. The material and the structure of the reactor used in the present invention is not particularly limited as long as the reactor has an ordinary capability of stirring. It is preferable that the reactor is capable of stirring in high viscosity conditions as the viscosity of the reaction system is increased in later stages of the reaction.

EXAMPLES

The following examples are set forth to provide those of ordinary skill in the art with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C.

Molecular weights are reported as number average ($M_n$) and were determined by GPC analysis of polycarbonate prepared by melt polymerization. Standards of polystyrene were used to construct a universal calibration against which polycarbonate could be measured using the Mark-Houwink equation. The temperature of the columns was 25° C. and the mobile phase was chloroform.

Fries content was measured by the KOH methanolysis of resin and is reported as parts per million (ppm). The content of Fries for each of the melt polycarbonates listed in Table 1 was determined as follows. First, 0.50 grams of polycarbonate was dissolved in 4.0 ml of THF (containing p-terphenyl as internal standard). Next, 3.0 ml of 18% KOH in methanol was added to this solution. The resulting mixture was stirred for two hours at this temperature. Next, 1.0 ml of acetic acid was added, and the mixture was stirred for 5 minutes. Potassium acetate was allowed to crystallize over 1 hour. The solid was filtered off and the resulting filtrate was analyzed by liquid chromoatograph using p-terphenyl as the internal standard.

The following is a description of how the preparation was prepared for Example 1 in Table 1. The remaining samples (Examples 2–25) were prepared by an otherwise identical procedure using the other catalysts listed in Table 1, except as noted. In particular, different catalysts and different end stage temperature were utilized.

The following reactions were carried out in a 1 liter glass batch reactor equipped with a solid nickel helical agitator. The glass reactor surface was passivated by acid washing, rinsing, and subsequently drying overnight at 70° C. and stored covered until use.

The temperature of the reactor was maintained using a fluidized sand bath with a PID controller and measured near the reactor and sand bath interface. The pressure of the reactor was controlled by a nitrogen bleed into the vacuum pump downstream of the distillate collection flasks and measured at higher pressures (760mm Hg to 40 mm Hg) with a mercury barometer, and at lower pressures (40 mm Hg to 1 mm Hg) with an Edward pirani gauge.

The reactor was charged with 0.6570 mol BPA and 0.7096 mol diphenyl carbonate prior to assembly. The reactor was then assembled, sealed and the atmosphere was exchanged with nitrogen three times. With the final nitrogen exchange, the reactor was brought to about atmospheric pressure and submerged into the fluidized bath which was at 180° C. After five minutes, agitation was begun at 250 rpm. After an additional ten minutes, the reactants were fully melted and a homogeneous mixture was assumed. Tetramethyl ammonium hydroxide (TMAH, $1.32 \times 10^{-4}$ mol) and sodium hydroxide (NaOH, $5.00 \times 10^{-7}$ mol) were added sequentially after being diluted to the proper concentrations (0.220 M TMAH and $5.00 \times 10^{-3}$ M NaOH) with 18 Mohm water. After the final catalyst was added, timing began, and the temperature was ramped to 210° C. in five minutes. Once at temperature, the pressure was reduced to 180 mm Hg and phenol distillate was immediately formed. After 25 minutes, the pressure was again reduced to 100 mm Hg and maintained for 45 minutes.

The temperature was then ramped to 240° C. in five minutes and the pressure was lowered to 15 mm Hg. These conditions were maintained for 45 minutes. The temperature was then ramped to 270° C. in five minutes and the pressure was lowered to 2 mm Hg. These conditions were maintained for 10 minutes. The temperature was then ramped to the final finishing temperature in five minutes and the pressure was reduced to 1.1 mm Hg. The finishing temperature was 310° C., except as noted otherwise. After 30 minutes, the reactor was removed from the sand bath and the melt was extruded into liquid nitrogen to quench the reaction.

Unless otherwise noted TMAH or TBPH was added at $2.5 \times 10^{-4}$ moles/ mole BPA. "Comp" indicates that the example is a comparative example.

TABLE 1

Polymerization Activity at 310° C.

| Example | Catalyst | Concentration (per mole BPA) | pH (0.005M) | Cocatalyst | Mn | Fries (ppm) |
|---|---|---|---|---|---|---|
| 1 (comp) | NaOH | $1 \times 10^{-6}$ | 12.00 | TMAH | 7597 | 471 |
| 2 (comp) | NaOH | $5 \times 10^{-6}$ | 12.00 | TMAH | 9500 | 3200 |
| 3 (comp) | TMAH only | | | | 1400 | 62 |
| 4 (comp) | Na$_2$SO$_4$ | $1 \times 10^{-6}$ | 6.22 | TMAH | 1200 | <25 |
| 5 (comp) | K$_2$SO$_4$ | $1 \times 10^{-6}$ | 6.08 | TMAH | 3058 | 80 |
| 6 (comp) | Cs$_2$SO$_4$ | $1 \times 10^{-6}$ | 7.00 | TMAH | 7824 | 249 |
| 7 | NaCsSO$_4$ | $1 \times 10^{-6}$ | 4.73 | TMAH | 4957 | 208 |
| 8 | NaCsSO$_4$ | $2 \times 10^{-6}$ | 4.73 | TMAH | 8000 | 132 |
| 9 | LiCsSO$_4$ | $2 \times 10^{-6}$ | | | 6453 | |

TABLE 1-continued

Polymerization Activity at 310° C.

| Example | Catalyst | Concentration (per mole BPA) | pH (0.005M) | Cocatalyst | Mn | Fries (ppm) |
|---|---|---|---|---|---|---|
| 10 | NaCsSO$_4$ | 5 × 10$^{-6}$ | 4.60 | TMAH | 8476 | 209 |
| 11 | KCsSO$_4$ | 5 × 10$^{-6}$ | 6.46 | TMAH | 8423 | 361 |
| 12 (comp) | Cs$_2$SO$_4$ | 5 × 10$^{-6}$ | 7.00 | TMAH | 9472 | 2136 |
| 13 | NaCsSO$_4$ | 1 × 10$^{-6}$ | 4.73 | TBPH | 7860 | 203 |

As can be seen from Table 1, utilizing sodium cesium sulfate minimizes the side branching reaction while still making high molecular weight polymer. Utilizing only one equivalent of sodium cesium sulfate results in lesser activity than NaOH, however utilizing two equivalents of sodium cesium sulfate provides an equivalent rate to sodium hydroxide without the disadvantage of making higher Fries. Substituting TBPH for TMAH in the sodium cesium sulfate system improves the rate to a level comparable to the TMAH/NaOH system.

This invention has been described in detail with particular reference to preferred embodiments thereof, but it will be understood that variations and modifications can be effected within the spirit and scope of the invention.

What is claimed is:

1. A method for the preparation of polycarbonate by the melt process comprising heating a diphenol together with a diarylcarbonate at a temperature in a range between about 100° C. and about 350° C. in the presence of a catalyst system comprising a catalytically effective amount of a mixed dialkali metal salt of sulfuric acid containing at least one cesium equivalent.

2. The method of claim 1, wherein the mixed dialkali metal salt of sulfuric acid containing at least one cesium equivalent is selected from the group consisting of potassium cesium sulfate; sodium cesium sulfate; and a mixture thereof.

3. The method of claim 1, wherein the catalyst system further comprises a base.

4. The method of claim 3, wherein the base is a quaternary ammonium compound; a quaternary phosphonium compound; or a mixture thereof.

5. The method of claim 1, wherein the diphenol is bisphenol A.

6. A method of reducing the Fries content of a polycarbonate comprising preparing a polycarbonate by a melt process by heating a diphenol together with a diarylcarbonate at a temperature in a range between about 100° C. and about 350° C. in the presence of a catalyst system comprising a catalytically effective amount of a mixed dialkali metal salt of sulfuric acid containing at least one cesium equivalent and a base.

7. The method of claim 6, wherein the base is TMAH, TBPH, TBP acetate or a mixture thereof.

8. A polycarbonate prepared by the method of claim 7.

9. A polycarbonate prepared by the method of claim 1.

10. The method of claim 7, wherein the diphenol is bisphenol A.

11. The method of claim 7, wherein the Fries content of the polycarbonate is less than 500 ppm.

12. The method of claim 7, wherein the Fries content of the polycarbonate is less than 200 ppm.

13. A method of reducing the branched side products of polycarbonate comprising preparing a polycarbonate by a melt process by heating a diphenol and a diaryl carbonate at a temperature in a range between about 100° C. and about 350° C. in the presence of a catalytically effective amount of a mixed dialkali metal salt of sulfuric acid containing at least one cesium equivalent and a base.

* * * * *